(12) United States Patent
Tuller

(10) Patent No.: US 9,359,712 B2
(45) Date of Patent: Jun. 7, 2016

(54) APPARATUS AND METHOD FOR CONTROLLING THE ENERGY USAGE OF AN APPLIANCE

(75) Inventor: Barry E. Tuller, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 633 days.

(21) Appl. No.: 13/439,047

(22) Filed: Apr. 4, 2012

(65) Prior Publication Data

US 2013/0268134 A1 Oct. 10, 2013

(51) Int. Cl.

| | |
|---|---|
| *G05D 3/12* | (2006.01) |
| *G05D 5/00* | (2006.01) |
| *G05D 11/00* | (2006.01) |
| *G05D 9/00* | (2006.01) |
| *D06F 58/28* | (2006.01) |
| *A47L 15/00* | (2006.01) |
| *D06F 33/02* | (2006.01) |
| *H02J 3/14* | (2006.01) |
| *F24C 7/08* | (2006.01) |

(52) U.S. Cl.
CPC ............ *D06F 58/28* (2013.01); *A47L 15/0047* (2013.01); *D06F 33/02* (2013.01); *F24C 7/08* (2013.01); *H02J 3/14* (2013.01); *H02J 2003/143* (2013.01); *H02J 2003/146* (2013.01); *Y02B 30/762* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
CPC ....... D06F 33/02; D06F 39/005; D06F 58/28; B23K 9/0953

USPC .......................................................... 700/291
See application file for complete search history.

(56) References Cited

U.S. PATENT DOCUMENTS

| | | | |
|---|---|---|---|
| 7,130,719 B2 | 10/2006 | Ehlers et al. | |
| 7,289,887 B2 | 10/2007 | Rodgers | |
| 7,349,766 B2 | 3/2008 | Rodgers | |
| 8,234,018 B2 * | 7/2012 | Besore ................ | A47L 15/0047 340/693.3 |
| 2003/0009265 A1 | 1/2003 | Edwin | |
| 2003/0036820 A1 | 2/2003 | Yellepeddy et al. | |
| 2003/0233201 A1 * | 12/2003 | Horst ........................ | H02J 3/14 700/295 |
| 2004/0128266 A1 | 7/2004 | Yellepeddy et al. | |
| 2009/0292402 A1 | 11/2009 | Cruickshank, III | |
| 2010/0070091 A1 | 3/2010 | Watson et al. | |
| 2010/0070434 A1 | 3/2010 | Cooper et al. | |
| 2010/0146712 A1 * | 6/2010 | Finch ..................... | G06Q 50/06 8/137 |
| 2010/0161146 A1 | 6/2010 | Boss et al. | |
| 2010/0174668 A1 * | 7/2010 | Finch et al. .................... | 705/412 |
| 2010/0175719 A1 * | 7/2010 | Finch et al. ..................... | 134/18 |
| 2010/0289643 A1 | 11/2010 | Trundle et al. | |
| 2011/0040417 A1 | 2/2011 | Wolfe et al. | |

(Continued)

FOREIGN PATENT DOCUMENTS

| | | |
|---|---|---|
| JP | 2002355487 A | 12/2002 |
| JP | 2007236538 A | 9/2007 |
| JP | 2009028069 A | 2/2009 |
| WO | 2009/085610 A2 | 7/2009 |

*Primary Examiner* — Mohammad Ali
*Assistant Examiner* — MD Azad

(57) ABSTRACT

A system and method for controlling an appliance with respect to the appliance's energy usage, in which a signal relating to the energy used by the appliance is received, and a determination of whether to continue or interrupt a cycle of operation being conducted by the appliance is made based at least on part upon the receipt of the signal.

25 Claims, 7 Drawing Sheets

(56) References Cited

U.S. PATENT DOCUMENTS

| | | |
|---|---|---|
| 2011/0098869 A1 | 4/2011 | Seo et al. |
| 2011/0106327 A1 | 5/2011 | Zhou et al. |
| 2011/0106328 A1 | 5/2011 | Zhou et al. |
| 2012/0065791 A1* | 3/2012 | Besore .................. G06Q 10/04 700/291 |

* cited by examiner

APPARATUS AND METHOD FOR CONTROLLING THE ENERGY USAGE OF AN APPLIANCE

BACKGROUND OF THE INVENTION

Home appliances use energy to perform cycles of operation, and users are increasingly interested in energy efficient home appliances that reduce the amount of energy an appliance uses to decrease energy costs. Enabling the user to manage energy use in appliances benefits not only the user, but also the utility suppliers who must respond to peak demands with minimal disruption to the supply. Previous energy management solutions enable users to select more energy efficient cycles, to delay appliance use until energy cost or demand is low, and to shut down or pause an appliance cycle in progress if energy cost/demand becomes high.

SUMMARY OF THE INVENTION

In one aspect, the invention relates to a method of controlling an appliance while running a cycle of operation, the method comprising receiving a signal including at least one of an energy usage reduction request and energy cost data, in response to the signal, determining a recovery cost for the appliance, which is the energy cost of interrupting the cycle of operation and completing the cycle of operation at a later time, determining a continued operation cost for the appliance, which is the energy cost of continuing the cycle of operation without interruption, comparing the recovery cost to the continued operation cost, and when the recovery cost is less than the continued operation cost, interrupting the cycle of operation.

In another aspect, the invention relates to an appliance configured to perform a cycle of operation, the appliance comprising a treating chamber for receiving an article for treatment according to the cycle of operation and a controller configured to implement the cycle of operation on the article in the treating chamber. The controller comprises a non-transitory storage medium, communication software in the non-transitory storage medium configured to effect communication between the controller and an external network, and control software in the non-transitory storage medium configured to execute the cycle of operation. While the control software executes the cycle of operation and when the communication software receives a signal including at least one of an energy usage reduction request and energy cost data, the controller will determine a recovery cost for the appliance, which is the cost of interrupting the cycle of operation and completing the cycle of operation at a later time, determine a continued operation cost for the appliance, which is the cost of continuing the cycle of operation without interruption, and compare the recovery cost to the continued operation cost. When the recovery cost is less than the continued operation cost, the controller will cause the control software to interrupt the cycle of operation on the article in the treating chamber.

DESCRIPTION OF EMBODIMENTS OF THE INVENTION

Figure 1:
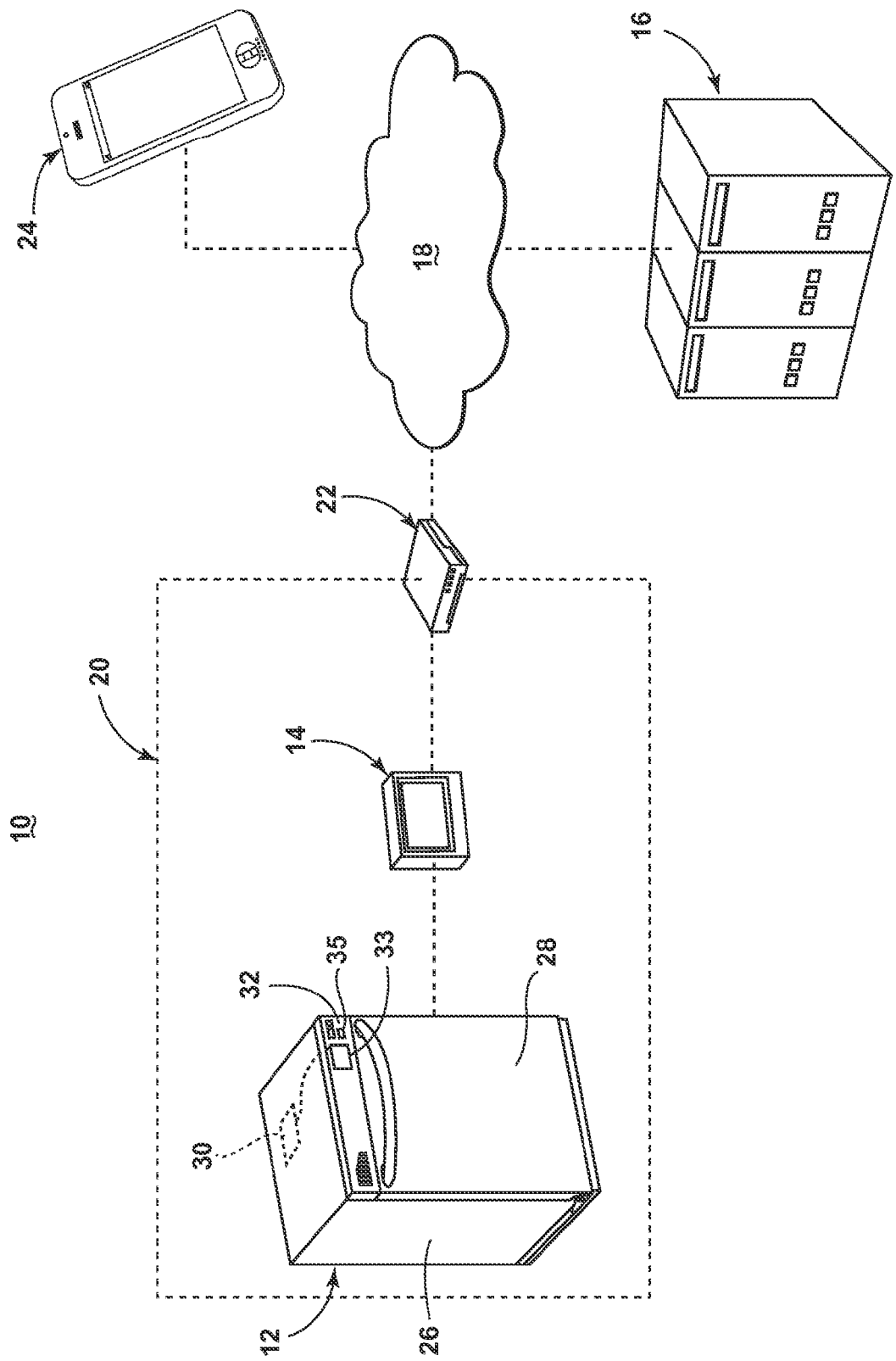
FIG. 1 is a schematic view of a system for controlling an appliance according to one embodiment of the invention.

FIG. 1 is a schematic view of a system 10 according to one embodiment of the invention. The system 10 includes at least one appliance 12 having a receiver 14 in communication with a remote device 16 via at least one communication network 18, such as the Internet. Optionally, the appliance 12 can be part of a home network or home area network (HAN) 20 for communication with other devices (not shown) within a home. A router 22 can be provided for forwarding data between the appliance 12 and the communication network 18. A user display 24 in a mobile device (as illustrated), or the receiver 14, or elsewhere on the appliance can also be provided for showing system information to a user about aspects of the system 10.

The appliance 12, illustrated herein as a dishwasher, of the system 10 may be a home or domestic appliance that performs a particular job in a home, including those relating to cleaning, cooking, or food preservation. The home appliance 12 may include a housing 26 at least partially defining a treating chamber (not shown) and having an open face selectively closed by a cover, shown herein as a door 28, for providing access to the treating chamber. The treating chamber can receive one or more article(s), and the appliance 12 may treat the article(s) according to a useful cycle of operation. For example, in the case of a dishwasher, the treating chamber can receive one or more dish(es), and the dishwasher can perform a cleaning system on the dish(es) in the treating chamber. While the appliance 12 is illustrated herein as a dishwasher, other types of appliances, including, but not limited to a refrigerator, a freezer, a range, a stove, an oven, a cooktop, a clothes washing machine, or a clothes dryer may be used with the system 10. All of these examples of home appliances can receive one or more article(s), and can perform a useful cycle of operation on the article(s). Other examples of appliance types typically found within a home and which may be used with the system include an air conditioner, a water heater, and a pool pump.

While only one appliance 12 is shown in FIG. 1, it should be understood that the system 10 can include more than one appliance 12. The appliances 12 can be located within a single home or at a common location, and some or all may be part of the HAN 20.

The receiver 14 can be used to connect the appliance 12 to the HAN 20, and may be a separate or an external device or it may be carried by or built into the appliance 12. The receiver 14 can communicate with the appliance by a wireless or wired connection. The receiver 14 is associated with the appliance 12 for receiving signals sent via the communication network 18. The receiver 14 can also have a transmitter, whereby signals from the appliance can be transmitted to the communication network 18 by the receiver 14 wirelessly.

The remote device 16 can communicate information with and/or respond to requests from the appliance 12 from a remote location, typically outside of the home or HAN 20. The remote device 16 can include a data storage unit for storing data, such as historical usage or operational data for the appliance 12 based on information from the receiver 14.

The remote device 16 may comprise one or more server(s) which manages the appliance's access to a centralized resource or service. For example, the remote device 16 may be a server of a utility provider, and may communicate demand information, such as if the utility were experiencing a high or critical demand, or pricing information, such as the present or future cost of energy. In another example, the remote device 16 may be a server of a manufacturer of the appliance 12 or some other third-party, and may communicate energy information similar to that from a utility provider. While only one remote device 16 is shown in FIG. 1, it should be understood that the system 10 may include multiple remote devices 16.

The communication network 18 may be a private or public network, and may typically be a WAN (wide area network) such as the Internet. Similarly the HAN 20 may be a private or public network, and may typically be a LAN (local area network). The router 22 forwards data between the communication network 18 and the HAN 20. The HAN 20 may have a different communication protocol than the communication network 18, in which case the router 22 or another device (not shown) can translate the data sent between the communication network 18 and the HAN 20 between the different communication protocols. The router 22 can be a separate device in the HAN 20, or it can be built into the appliance 12 or the device 14.

The user display 24 can provide users with access and control of the appliance 12, the device 14, and/or the HAN 20. Through the user display 24, a user can monitor and control energy consumption by the appliance 12. The user display 24 may, for example, comprise a smartphone, a tablet computer, a desktop computer, and a notebook computer. While not shown in FIG. 1, the user display 24 may be coupled with the HAN 20.

Figure 2:
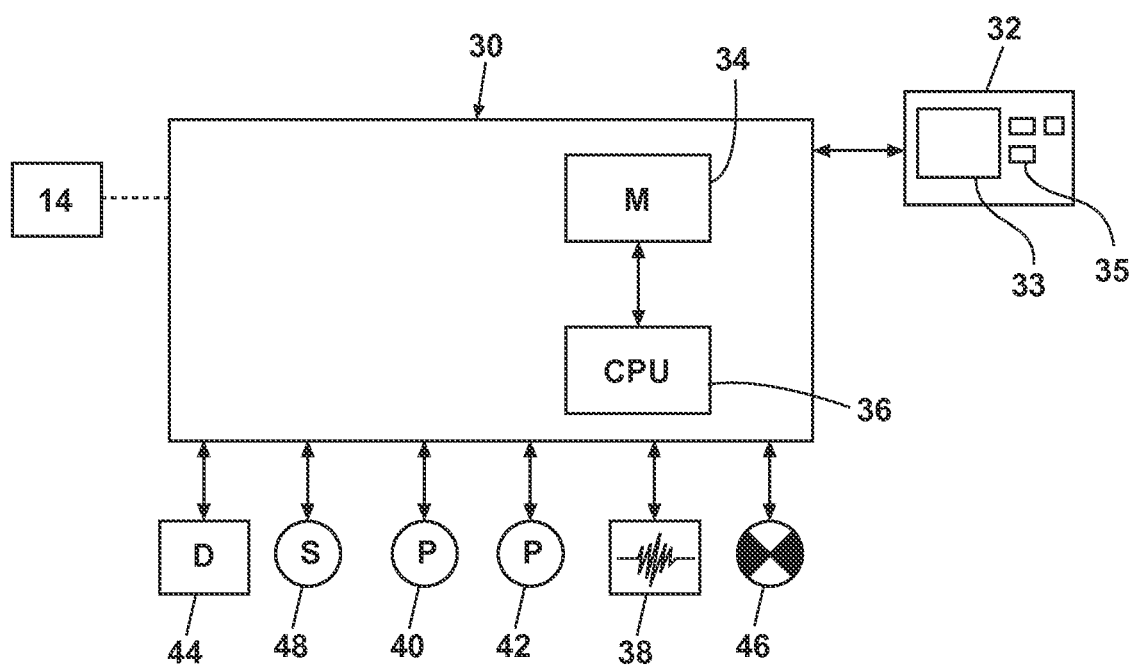
FIG. 2 is a schematic view of a controller of the appliance of FIG. 1.

Referring to FIG. 2, one embodiment of a controller 30 for the appliance 12 is illustrated. The controller 30 controls the operation of the appliance 12 to implement one or more cycles of operation. The controller 30 may be located within the appliance 12, and be operable coupled with a control panel or a user interface 32 for receiving user-selected inputs and communicating information to the user. The user interface 32 may include operational controls such as dials, lights, switches, and displays enabling a user to input commands, such as a cycle of operation, to the controller 30, and receive information. The user interface 32 is shown as provided on the door 28 of the appliance in FIG. 1. The user interface 32 may, for example, include at least one display 33 and at least one selector or button 35. The display 33 can include lights or other discrete indicators with accompanying text, or a graphical user interface, such as touch screen. The button 35 can include a push button, switch, or dial on the user interface 32 that a user physically actuates, or a virtual button on a graphical user interface, such the display 33. Alternatively or in addition, the user display 24 may be used as a user interface 32 for the appliance, and may be coupled with the controller 30.

Options may be provided for the user to select or control how the system 10 or appliance 12 reacts to energy events. Such selections can be made at the appliance 12, the receiver 14, or through the user display 24. For example, the display 33 or button 35 on the user interface 32 of the appliance 12 may be used to activate one of a power saving setting, a money saving setting, and an ignore setting of the appliance 12. The power saving setting may be a setting that a user can select in order to set the controller 30 to automatically take actions that will minimize the amount of power that the appliance 12 consumes. The money saving setting may be a setting that a user can select in order to set the controller 30 to automatically take actions that will minimize the cost of operating the appliance 12 for the user. The ignore setting may be a setting that a user can select in order to set the controller 30 to operate without any special regard to the amount of power that the appliance 12 consumes or the cost of operating the appliance 12.

As illustrated in FIG. 2, the controller 30 may be provided with a non-transitory storage medium 34 and a central processing unit (CPU) 36. The non-transitory storage medium 34 may include any suitable computer-readable media, with the sole exception being a transitory, propagating signal, one non-limiting example of which includes a memory. The non-transitory storage medium 34 may be used for storing communication software which is configured to effect communication between the controller 30 and an external network, such as the HAN 20 or the communication network 18. The non-transitory storage medium 34 may also be used for storing control software that is configured to effect one or more cycles of operation by the appliance 12. Examples, without limitation, of cycles of operation in the case of a dishwasher include: Smart Wash, Pots/Pans, Normal Wash, China/Gentle, Fast Wash, and Quick Rinse. The communication and control software can be executed by the CPU 36. The non-transitory storage medium 34 may also be used to store information, such as a database or table, and to store data received from one or more components of the appliance 12 that may be communicably coupled with the controller 30. The database or table may be used to store the various operating parameters for the one or more cycles of operation, including factory default values for the operating parameters and any adjustments to them effected by the control system or by user input.

The controller 30 may be operably coupled with one or more components of the appliance 12 for communicating with and controlling the operation of the component to complete a cycle of operation. For example, in the case of a dishwasher, the controller 96 may be operably coupled with a heater 38 for heating wash liquid during a cycle of operation, a drain pump 40 for draining liquid from the treating chamber, a recirculation pump 42 for recirculating wash liquid during a cycle of operation, a dispenser 44 for dispensing a treating agent during a cycle of operation, one or more valve(s)s 46 for controlling the flow of liquid or air through the treating chamber, and one or more sensor(s) 48 to control the operation of these and other components to implement one or more of the cycles of operation. Non-limiting examples of a sensor 48 that may be communicably coupled with the controller 30 include a temperature sensor and a turbidity sensor to determine the soil load associated with a selected grouping of dishes, such as the dishes associated with a particular area of the treating chamber. In the case of other types of home appliances, the controller 30 may be operably coupled with components typical to such appliances that are commonly controlled.

The previously described system 10 and appliance 12 provides the structure necessary for the implementation of a method of the invention. One embodiment of the method will now be described in terms of the operation of the appliance 12.

Appliances receive energy from a utility or utility provider. The cost of that energy fluctuates, sometimes depending on whether there is a high demand for energy during a certain time period. Previous energy management solutions have attempted to control appliances based on the fluctuating cost or demand. When a cycle of operation is in progress or about to begin, previous energy management solutions have permitted the cycle to the paused, delayed, and/or scheduled.

Appliances use varying amounts of energy while performing a cycle of operation; some activities within a cycle consume more energy than others. For example, one high-energy activity performed by appliances such as dishwashers and clothes washers is heating water. Other non-limiting examples of high-energy operations include making ice in a refrigerator, drying clothing on a high heat setting in a clothes dryer, heating an oven to a selected cooking temperature, self-cleaning an oven, and generating steam in a steam appliance. If a cycle of operation in a dishwasher were suspended in response to a demand for energy reduction after a volume of water has already been heated, and during the suspension the water cools, the dishwasher would have to reheat the water again upon resuming the cycle of operation. In such a case, suspending an appliance mid-operation may be less energy efficient and more costly to a user than allowing the appliance to finish its current activity or even the entire cycle of operation.

Embodiments of a method according to the invention function to determine whether or not an appliance should suspend an in-progress cycle of operation, based on a recovery cost for the appliance. In one embodiment, when an energy event at the utility grid, such as a change in cost or demand, is signaled, a recovery cost for the appliance is determined, assuming it will be in operation during the energy event. The recovery cost may be the cost of completing the cycle of operation at a later time and can be based on the duration of the energy event and the cost of energy before, during, and after the energy event. The recovery cost may be compared to the cost of completing the cycle without interruption, which can be based on the duration of the energy event and the cost of energy before, during, and after the energy event. If the recovery cost were determined to be less than the cost of completing the cycle without interruption, then the appliance cycle of operation may be interrupted during the energy event. On the other hand, if the recovery cost were determined to be greater than the cost of completing the cycle without interruption, then the appliance cycle of operation may continue unabated during the energy event. In a home or system with multiple appliances, the recovery cost for each appliance can be determined system-wide, and the system can interrupt all appliances that have a recovery cost less than the cost to continue operation of the appliance during the energy event. Thus, the overall energy bills to the user can be minimized. Additional options can be provided for the user to select or control how the system 10 or appliance 12 reacts to energy events, as discussed in more detail below.

FIGS. 3-7 show flow charts depicting various embodiments of the method of the invention. It is understood that the embodiments of the methods shown in the flow charts can be combined in any logical manner, without detracting from the invention.

Figure 3:
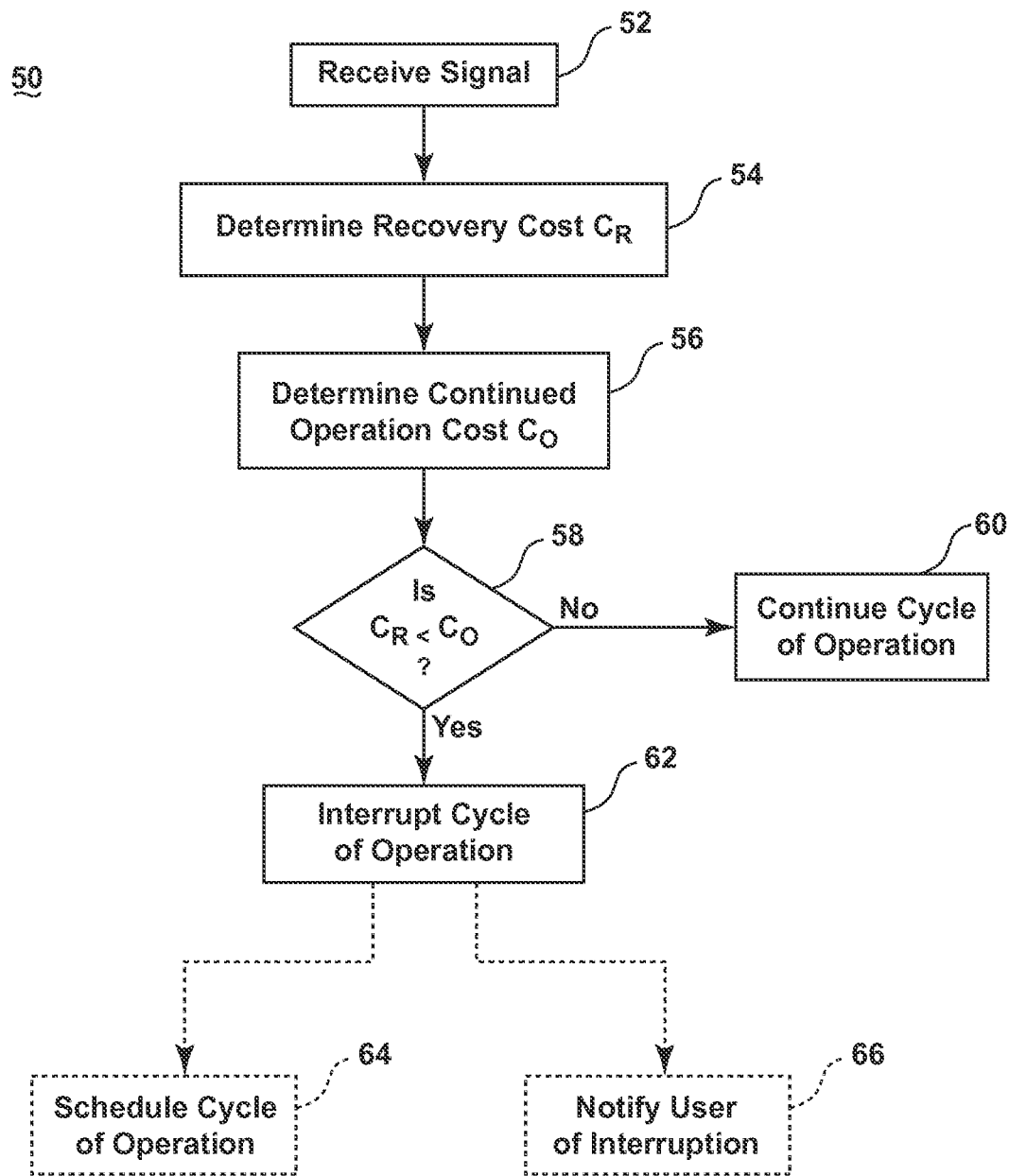
FIG. 3 is a flow chart depicting a first embodiment of a method of controlling an appliance during a cycle of operation being performed by the appliance.

FIG. 3 is a flow chart depicting a method 50 of controlling an appliance during a cycle of operation being performed by the appliance, according to one embodiment of the invention. The method 50 may be executed at least in part by the controller 30 of the appliance during a cycle of operation of the appliance 12; in other words, during the execution of the control software by the CPU 36. The sequence of steps depicted is for illustrative purposes only and is not meant to limit the method 50 in any way as it is understood that the steps may proceed in a different logical order, additional or intervening steps may be included, or described steps may be divided into multiple steps, without detracting from the invention.

Generally, in normal operation of the appliance 12, a user first selects an appropriate cycle of operation via the user interface 32. The cycle of operation may be in progress prior to the start of the method 50. At 52, the method 50 may start when a signal is received that indicates an oncoming or current energy event, such as a change in at least one energy parameter. One common type of energy resource is electricity, but others commonly used in appliances include natural gas and water in various phases.

The energy parameter may take the form of a request or a notification, and may, for example, be an energy reduction request or a change in energy cost data such as a price increase that applies during a peak event. An energy reduction request may include a request or demand to reduce the energy usage of the appliance 12, and may specifically request that the appliance 12 be powered off or may include an amount of energy used by the appliance 12 that needs to be reduced. Energy cost data indicates the cost or price of energy, and can be a specific amount, such as in the units of dollars ($) per kilowatt-hour (kWh), or a pricing tier having a preset value or range. In either case, the energy cost data can be formatted in terms of a cost value or a cost change. When formatted in terms of a cost change, for example, the energy cost data may indicate that the energy rate is increasing by $2 per kWh or that the pricing tier will increase by one tier.

The signal may be sent from the remote device 16. In one example, the remote device 16 can be operated by a utility that supplies energy to the appliance 12. In another example, the remote device 16 can be operated by a third-party or appliance manufacturer that in turn receives energy information from a utility. The signal may generated internally to the appliance based on a trigger such as a time clock that registers a cost change for predetermined hours during the day.

The signal may be received by the receiver 14 and forwarded to the controller 30 of the appliance 12. More specifically, the communication software stored by the non-transitory storage medium 34 and executed by the CPU 36 of the controller 50 can receive the signal. The router 22 may be used as a gateway for communicating the signal between the remote device 16 and the receiver 14 via the communication network 18.

The signal can be sent simultaneously when the energy event occurs. Alternatively, the signal can be sent prior to the energy event, and can include an indication of when an energy parameter change will occur, such as a date and time. In either case, the signal can include a time parameter associated with the energy event. The time parameter can be one or more of a start time, and end time, or a duration of the energy event. Thus, the signal can include an indication of the duration of the energy event, such as a time period during which an energy parameter change will be in effect, or an indication of when an energy parameter will return to its pre-event value, such as a date and time.

At 54, in response to receiving the signal at 52, a recovery cost for the appliance 12 can be determined. The recovery cost can more specifically be determined by the controller 50 of the appliance 12. The recovery cost is the energy cost of interrupting the current cycle of operation and completing the cycle of operation at a later time. The point at which the cycle is interrupted can be termed an interruption point for the purposes of discussion herein. The interruption point can be determined or predicted from information provided by the signal.

The recovery cost can be determined based on the instantaneous running cost of operating the appliance 12, an estimated cost of operating the appliance 12 up to the interruption point, a historical cost of operating the appliance 12 up to the interruption point, or can be based on an average cost of operating the appliance 12 up to the interruption point.

Generally, the recovery cost can be based on energy cost data and a power requirement associated with the cycle of operation that is in progress when the signal is received at 52. More specifically, the recovery cost can be based on the cost of energy during the energy event signaled at 52 and the power requirement to restart and complete the cycle of operation. A power requirement may be the amount of time and the rate at which power is used during a cycle of operation. A cycle of operation can be broken into different phases or activities, and each phase or activity can have an associated power requirement. A power requirement to restart the cycle of operation is the amount of power required to return the appliance 12 to the interruption point, and can factor in how long the appliance is interrupted.

The energy cost data can be obtained from a utility or utility provider that supplies power to the appliance 12 or a manufacturer of the appliance 12. The energy cost data can be sent via the signal received at 52, or it can be received separately. For example, the energy cost data can be received in conjunction with an energy event in separate signal. In another example, the energy cost data can be stored in a memory of the appliance 12, and recalled upon receiving the signal at 52. The energy cost data can be programmed into the appliance 12 by the manufacturer, or can be periodically sent to the appliance 12 via the communication network 18. For example, a utility provider can bill according to a set pricing tier, such as having one price during a normal or low demand period, a higher price during a high demand period, and an even higher price during a critical demand period. The pricing tiers can be saved to the memory of the appliance 12, and updated as needed by the utility provider.

The energy cost data can include a first cost of energy during a first rate time period, and a second cost of energy during a second rate time period. For example, the first rate time period may be after the energy event signaled at 52 is complete, and the second rate time period may be during the energy event signaled at 52. Thus, the second cost may be higher than the first cost. The energy cost data can further include a third cost of energy during a third rate time period, which may be before the event signaled at 52. Thus, the second cost may be higher than the third cost. The first cost may be the same as, higher than, or lower than the third cost.

At 56, a continued operation cost for the appliance 12 can be determined. The continued operation cost can more specifically be determined by the controller 50 of the appliance 12. The continued operation cost is the energy cost of continuing the cycle of operation without interruption. The continued operation cost can be based on an estimated cost of operating the appliance 12 from the interruption point to completion, a historical cost of operating the appliance 12 from the interruption point to completion, or can be based on an average cost of operating the appliance 12 from the interruption point to completion.

Generally, the continued operation cost can be based on energy cost data and a power requirement associated with the cycle of operation that is in progress when the signal is received at 52. More specifically, the continued operation cost can be based on the cost of energy after the energy event signaled at 52 and the power requirement to complete the cycle of operation. The continued operation cost may also be based on the cost of energy before the energy event signaled at 52 and the power requirement of the portion of the cycle that will already have been completed when the energy event begins.

The controller 30 may optionally take additional data into account when determining the recovery and continued operation costs, including one or more of the selected cycle, cycle conditions, user input, data from the sensor 48, geographical location of the appliance 12, and environmental or ambient conditions surrounding the appliance 12.

At 58, the recovery cost is compared to the continued operation cost. Specifically, the controller 30 may determine if the recovery cost is less than, equal to, or greater than the continued operation cost. If the recovery cost is greater than the continued operation cost, the cycle of operation may be continued at 60. If the recovery cost is equal to the continued operation cost, the cycle of operation may also be continued at 60. However, a user may be provided with the option of interrupting a cycle of operation when the recovery and continued operation costs are equal in order to contribute to energy usage reduction on a utility or grid-wide level. Continuing the cycle of operation at 60 may comprise continuing the cycle without alteration, or continuing the cycle at a reduced power level, such as by deactivating one or more power-consuming components of the appliance 12.

If the recovery cost is less than the continued operation cost, the cycle of operation may be interrupted at 62. In one example, the controller 30 can cause the control software to interrupt the cycle of operation on the article in the treating chamber of the appliance 12. In the case of the dishwasher, the control software may deactivate one or more of the heater 38, the drain pump 40, the recirculation pump 42, and the sensor(s) 48, or any other energy-consuming component. In other cases, the control software may need to open or close the valve(s) 46 or operate the drain pump 40 for a given time in order to prepare the dishwasher for a period of delay or inactivity.

At 62, interrupting the cycle of operation may include pausing the cycle of operation for a given period of time. The period of time may be determined from the signal received at 52. Alternatively, the cycle of operation may remain paused until another signal is received, indicating that the energy parameter has changed again, at which time the method 50 will begin from 52.

Interrupting the cycle at 62 may include interrupting the cycle at its present point, or continuing the cycle until an energy-efficient stopping point is reached and then interrupting the cycle. For example, the cycle may be continued until the end of its current activity phase and then interrupted.

Optionally, when a cycle of operation is interrupted at 62, the method 50 can further include scheduling, at 64, the resumption of the cycle of operation for a later time. For example, the cycle can be scheduled to resume after the energy event, after a predetermined period of time has lapsed, or when the recovery cost is less than the continued operation cost.

Also provided as an optional action when a cycle of operation is interrupted at 62 is a notification 66. Specifically, the method 50 can further include notifying a user of the appliance 12 that the cycle of operation has been interrupted. The notification at 66 can include communicating the interruption to the user via the user display 24 or the user interface 32 of the appliance 12. The notification can include information such as: an identification of the appliance 12, an identification of the cycle of operation that was interrupted, an identification of the point or phase at which the cycle of operation was interrupted, a cost savings from the interruption, and an indication of when the cycle of operation will resume or be completed. Using the user display 24 as the medium, the notification can comprise sending an email or a text message to the user. In one example, the email or text message can be sent from the remote device 16 to the user display 24 via the communication network 18. Using the user interface 32 as the medium, the notification can comprise displaying the notification to the user on the display 33.

The appliance 12 may be configured to perform the method 50 by default; alternatively, the appliance 12 can be provided with a money saving mode, in which the method 50 is performed, and the cost of operating the appliance 12 is minimized. A user can set the appliance 12 to the money saving mode via the user interface 32 or the user display 24. By being set to save money, the appliance 12 can minimize the utility bills for the user, without the user having to take an active role in the process.

Figure 4:
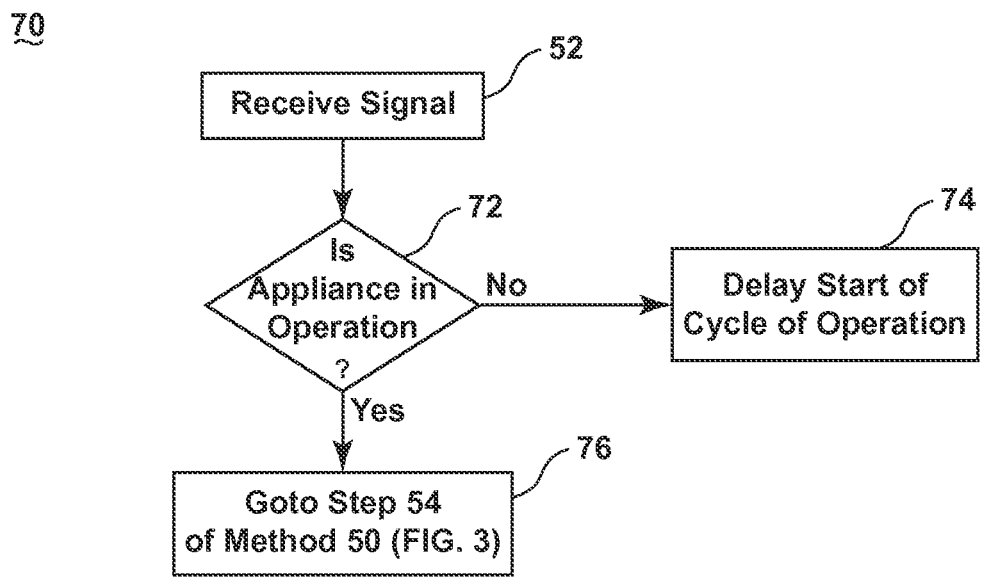
FIG. 4 is a flow chart depicting a second embodiment of a method of controlling an appliance.

FIG. 4 is a flow chart depicting an optional method 70 that can be used to supplement the method 50 of FIG. 3. The method 70 may begin the same as method 50, with receiving a signal at 52 that indicates an oncoming or current energy event. Next, instead of automatically determining the recovery cost, it may next be determined if the appliance 12 is in operation, i.e. if a cycle of operation is in progress at 72. If the appliance 12 is not in operation, starting of the appliance 12 may be delayed at 74 until, for example, the energy event is over. By delaying the appliance, the appliance 12 may be effectively prevented from beginning a cycle of operation during the energy event. The user can be provided with the option of overriding the delay. If the appliance is determined to be in operation at 72, then at 75 the method skips to step 54 of FIG. 3, and the recovery cost is determined.

Figure 5:
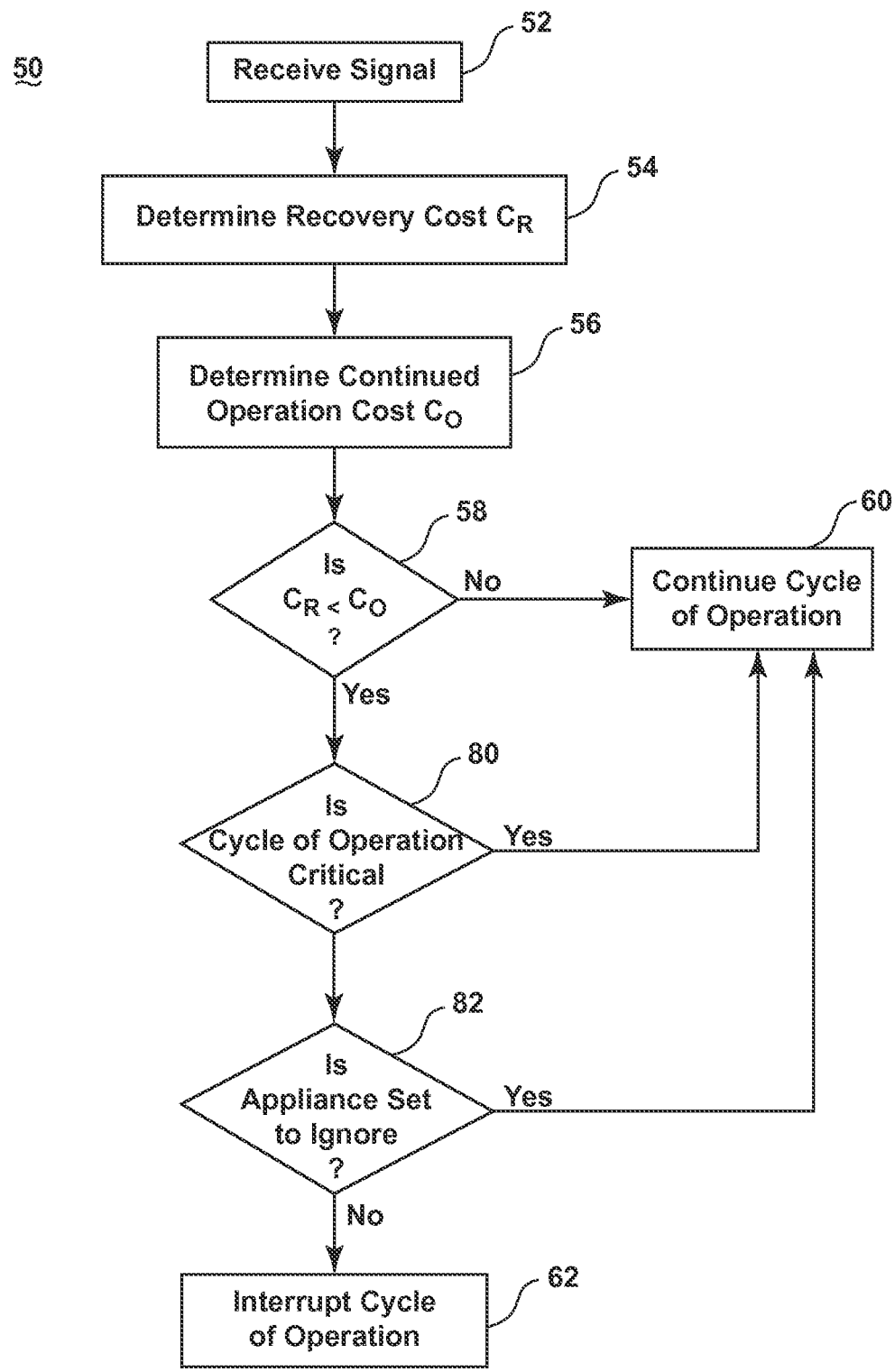
FIG. 5 is a flow chart depicting a third embodiment of a method of controlling an appliance during a cycle of operation being performed by the appliance.

FIG. 5 is a flow chart depicting an alternative embodiment of method 50. Steps 52-58 may proceed as described above with respect to FIG. 3. However, at 58, if the recovery cost is less than the continued operation cost, it may next be determined if the cycle of operation is critical at 80. A critical cycle may be one that cannot or should not be interrupted when in progress, and can be predetermined by the manufacturer of the appliance 12 or the user of the appliance 12. Some non-limiting examples of critical cycles include a self-clean cycle in an oven and a sanitizing cycle in a dishwasher.

If the cycle is determined to be critical at 80, the cycle of operation is continued at 60. If the cycle is determined to be non-critical at 80, it is next determined at 82 if the appliance is set to ignore energy events. The appliance 12 may be provided with an ignore mode, in which case any energy events are ignored, and the controller 30 is enabled to operate without any special regard to the amount of power that the appliance 12 consumes or the cost of operating the appliance 12. A user can set the appliance 12 to the ignore mode via the user interface 32 or the user display 24. If the appliance 12 is set to ignore energy events at 82, the cycle of operation is continued at 60; otherwise it may be interrupted at 62. It should be noted that the cycle 50 can proceed in any logic order; for example, is also understood that either of the criticality of the cycle at 80 or the appliance ignore setting at 82 may be determined before determining the recovery cost at 54, and further that the ignore setting determination at 82 need not be dependent on the criticality determination at 80, and vice versa.

Figure 6:
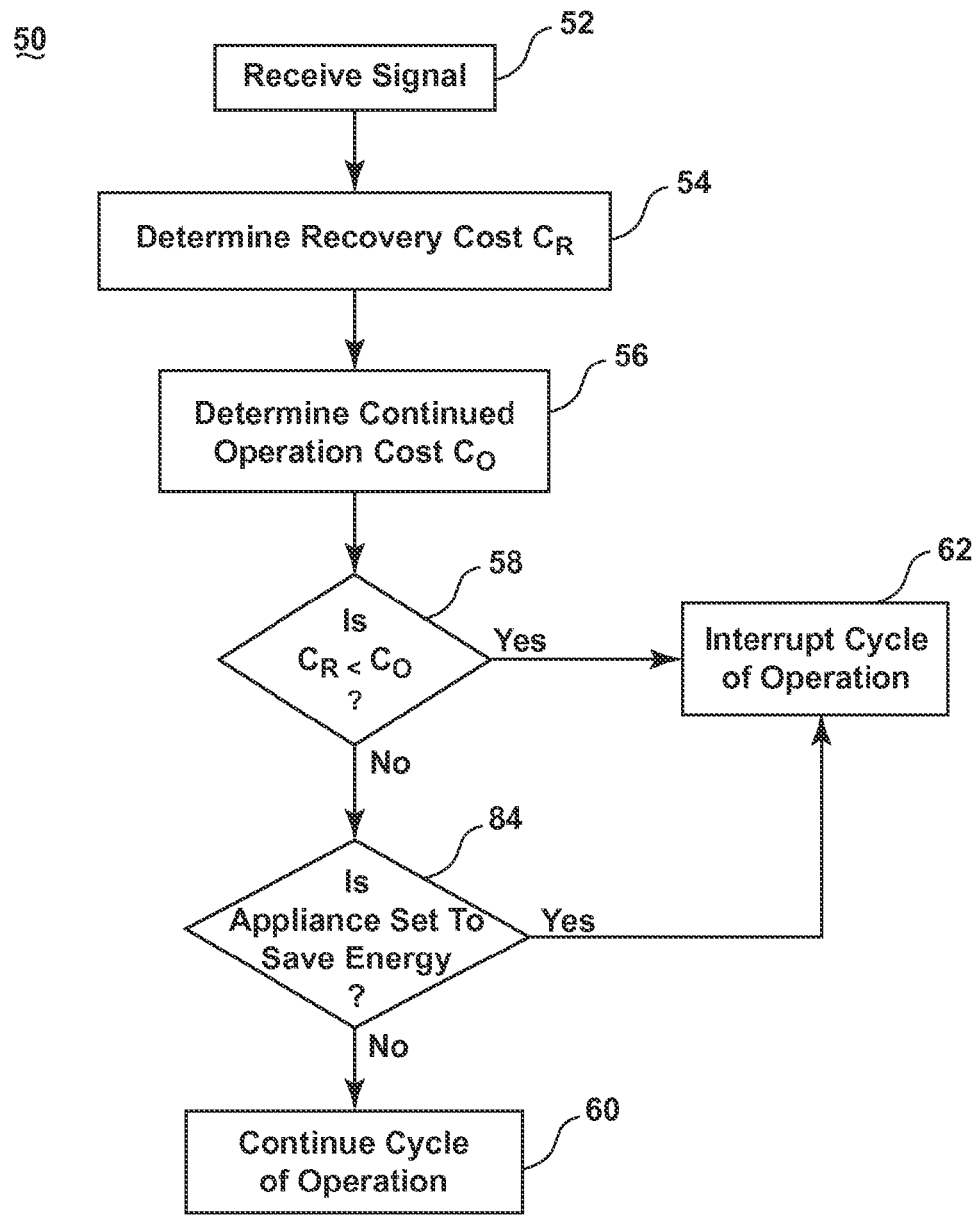
FIG. 6 is a flow chart depicting a fourth embodiment of a method of controlling an appliance during a cycle of operation being performed by the appliance.

FIG. 6 is a flow chart depicting another alternative embodiment of method 50. Steps 52-58 may proceed as described above with respect to FIG. 3. However, at 58, if the recovery cost is greater than or equal to the continued operation cost, it may next be determined if the appliance 12 is set to save energy at 84. The appliance 12 can be provided with a power saving mode, in which the controller 30 automatically takes actions that will minimize the amount of power that the appliance 12 consumes. A user can set the appliance 12 to the power saving mode via the user interface 32 or the user display 24. By being set to save energy, the appliance 12 can minimize the amount of energy it uses, which will contribute to energy usage reduction on a utility or grid-wide level. If the appliance 12 is set to save energy at 84, the cycle of operation is interrupted at 62. If the appliance 12 is set to save energy at 84, the cycle of operation is continued at 60. It should be noted that the cycle 50 can proceed in any logic order; for example, is also understood that the appliance energy setting may be determined before determining the recovery cost at 54.

Figure 7:
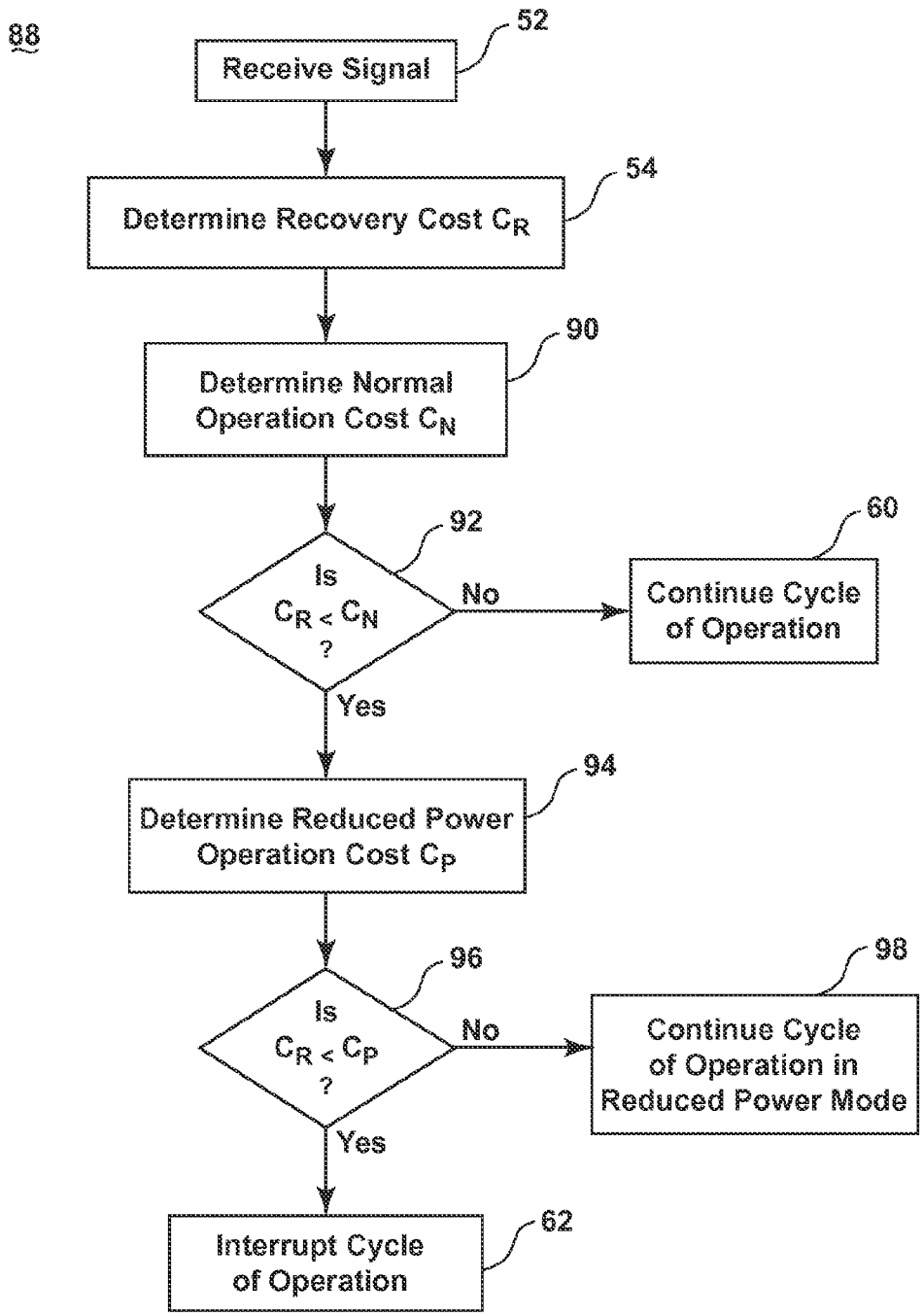
FIG. 7 is a flow chart depicting a fifth embodiment of a method of controlling an appliance during a cycle of operation being performed by the appliance.

FIG. 7 is a flow chart depicting an optional method 88 that can be used to supplement the method 50 of FIG. 3. The method 88 may begin the same as method 50, with receiving a signal at 52 that indicates an oncoming or current energy event and determining a recovery cost at 54. Next, instead of generally determining a continued operation cost, the method 88 will more specifically determine the continued operation cost by first determining a normal operation cost at 90, which is the cost of continuing the cycle of operation without interruption in a normal mode, i.e. in the current or default mode of the cycle. The normal operation cost can be based on an estimated cost of operating the appliance 12 in the normal mode from the interruption point to completion, a historical cost of operating the appliance 12 in the normal mode from the interruption point to completion, or it can be based on an average cost of operating the appliance 12 in the normal mode from the interruption point to completion.

At 92, the recovery cost is compared to the normal operation cost. Specifically, the controller 30 may determine if the recovery cost is less than, equal to, or greater than the normal operation cost. If the recovery cost is greater than or equal to the normal operation cost, the cycle of operation may be continued at 60, as described above.

If the recovery cost is less than the normal operation cost, the continued operation cost is next determined by determining a reduced power operation cost at 94, which is the cost of continuing the cycle of operation without interruption in a reduced power mode. The reduced power operation cost can be based on an estimated cost of operating the appliance 12 in the reduced power mode from the interruption point to completion, a historical cost of operating the appliance 12 in the reduced power mode from the interruption point to completion, or it can be based on an average cost of operating the appliance 12 in the reduced power mode from the interruption point to completion. Some non-limiting examples of reduced power modes include delaying ice making or defrosting in a refrigerator, air drying (i.e. no heating of air) in a clothes dryer or a dishwasher, and cold washing or rising (i.e. no heating of water) in a clothes washing machine.

If the recovery cost is less than the reduced power operation cost, the cycle of operation is interrupted at 62, as described above with respect to FIG. 3. If the recovery cost is greater than the reduced power operation cost, the cycle of operation is continued in the reduced power mode at 98. If the recovery cost is equal to the reduced power operation cost, the cycle of operation may also be continued at 98. However, a user may be provided with the option of interrupting a cycle of operation when the recovery and reduced power operation costs are equal in order to contribute to energy usage reduction on a utility or grid-wide level.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of controlling an appliance during a cycle of operation being performed by the appliance, comprising:
receiving a signal including at least one of an energy usage reduction request and energy cost data;
in response to the signal, determining a recovery cost as the energy cost of interrupting the cycle of operation and completing the cycle of operation at a later time;
determining a continued operation cost as the energy cost needed to continue the cycle of operation without interruption, including determining a normal operation cost, which is the cost of continuing the cycle of operation without interruption in a normal mode, and determining a reduced power operation cost, which is the cost of continuing the cycle of operation without interruption in a reduced power mode;
comparing the recovery cost to the continued operation cost, including comparing the recovery cost to the normal operation cost and comparing the recovery cost to the reduced power operation cost; and
if the recovery cost is less than the reduced power operation cost and the normal operation cost, interrupting the cycle of operation and if the recovery cost is equal to or greater than the reduced power operation cost and less than the normal operation cost, continuing the cycle of operation without interruption in the reduced power mode.

2. The method of claim 1, wherein receiving the signal comprises receiving the signal from a utility that supplies power to the appliance.

3. The method of claim 1, wherein the signal further includes a time parameter associated with the at least one of the energy usage reduction request or energy cost data.

4. The method of claim 1, wherein the energy usage reduction request comprises a request to power off the appliance.

5. The method of claim 1, wherein the energy cost is based on energy cost data that includes a change in the energy cost.

6. The method of claim 5, wherein the energy cost data includes at least one of a first energy cost, a second and/or a third energy cost.

7. The method of claim 6, wherein the second cost per unit of energy is higher than the first energy cost.

8. The method of claim 1, wherein continuing the cycle of operation without interruption comprises continuing the cycle of operation in a reduced power mode.

9. The method of claim 1, wherein interrupting the cycle of operation comprises pausing the cycle of operation for a period of time.

10. The method of claim 9, wherein the period of time is included in the signal.

11. The method of claim 1, further comprising scheduling an interrupted cycle of operation for a later time when the recovery cost is less than the continued operation cost.

12. The method of claim 1, further comprising determining if the cycle of operation is critical, and, when the cycle of operation is determined to be critical, continuing the cycle of operation without interruption regardless of the comparison of the recovery cost to the continued operation cost.

13. The method of claim 1, further comprising determining if a power saving setting is active in the appliance, and when the power saving setting is active, interrupting the cycle of operation upon receiving the signal, regardless of the comparison of the recovery cost to the continued operation cost.

14. The method of claim 1, further comprising determining if an ignore setting is active in the appliance, and when the ignore setting is active, continuing the cycle of operation upon receiving the signal, regardless of the comparison of the recovery cost to the continued operation cost.

15. The method of claim 1, further comprising providing access to energy cost data from a utility that supplies power to the appliance.

16. The method of claim 15, wherein the energy cost data is stored in a memory of the appliance.

17. The method of claim 1, further comprising notifying a user of the appliance that the cycle of operation has been interrupted when the recovery cost is less than the continued operation cost.

18. The method of claim 17, wherein notifying comprises at least one of emailing or texting the user.

19. The method of claim 17, wherein notifying comprises displaying a notification on at least one of a smartphone, a tablet computer, a desktop computer, or a notebook computer.

20. The method of claim 19, wherein the notification comprises displaying a cost savings, which is the difference between the recovery cost and the continued operation cost, to the user.

21. An appliance configured to perform a cycle of operation comprising:
a treating chamber for receiving an article for treatment according to the cycle of operation; and
a controller configured to implement the cycle of operation on the article in the treating chamber, the controller comprising:
a processor; and
a non-transitory storage medium storing machine readable instructions that when executed by the processor causes the controller to at least:
determine a recovery cost for the appliance as the energy cost of interrupting the cycle of operation and completing the cycle of operation at a later time,
determine a continued operation cost as the energy cost needed to continue the cycle of operation without interruption, including determining a normal operation cost, which is the cost of continuing the cycle of operation without interruption in a normal mode, and determining a reduced power operation cost, which is the cost of continuing the cycle of operation without interruption in a reduced power mode;
compare the recovery cost to the continued operation cost, including comparing the recovery cost to the normal operation cost and comparing the recovery cost to the reduced power operation cost; and
if the recovery cost is less than the reduced power operation cost and the normal operation cost, interrupt the cycle of operation on the article in the treating chamber and if the recovery cost is equal to or greater than the reduced power operation cost and less than the normal operation cost, continuing the cycle of operation without interruption in the reduced power mode.

22. The appliance of claim 21, further comprising a user interface operably coupled with the controller.

23. The appliance of claim 22, wherein the user interface comprises a display for notifying a user of the appliance that the cycle of operation has been interrupted.

24. The appliance of claim 22, wherein the user interface comprises a button for activating at least one of a power saving setting, a money saving setting, and/or an ignore setting.

25. The appliance of claim 21, wherein the appliance is at least one of a dishwasher, a refrigerator, a freezer, a range, a stove, an oven, a cooktop, a clothes washing machine, or a clothes dryer.

* * * * *